(12) United States Patent
Gibbs

(10) Patent No.: US 7,168,714 B2
(45) Date of Patent: Jan. 30, 2007

(54) LAWN AND GARDEN IMPLEMENT CADDY

(76) Inventor: Richard L. Gibbs, 2301 S. Dividsadero, Sp. 70, Visalia, CA (US) 93277

( * ) Notice: Subject to any disclaimer, the term of this patent is extended or adjusted under 35 U.S.C. 154(b) by 218 days.

(21) Appl. No.: 10/802,122

(22) Filed: Mar. 13, 2004

(65) Prior Publication Data

US 2004/0206517 A1    Oct. 21, 2004

Related U.S. Application Data

(60) Provisional application No. 60/461,377, filed on Apr. 10, 2003.

(51) Int. Cl.
*B62B 3/00* (2006.01)
(52) U.S. Cl. ............... 280/47.34; 280/47.26; 280/79.5
(58) Field of Classification Search ............ 280/47.26, 280/47.34, 47.35, 62, 79.4, 79.5, 79.6
See application file for complete search history.

(56) References Cited

U.S. PATENT DOCUMENTS

| | | | |
|---|---|---|---|
| 1,751,902 A * | 3/1930 | Brown ............... | 280/47.26 |
| 2,596,749 A * | 5/1952 | Webber .............. | 211/70.6 |
| 2,901,262 A * | 8/1959 | Berlin ............... | 280/641 |
| 3,598,420 A | 8/1971 | Edlin | |
| 3,845,968 A | 11/1974 | Larson | |
| 3,894,748 A | 7/1975 | Ratcliff | |
| 4,350,366 A | 9/1982 | Helms | |
| D282,499 S * | 2/1986 | Alstrom ............. | D34/17 |
| D282,594 S * | 2/1986 | Latino ............... | D34/21 |
| 4,629,203 A | 12/1986 | Ballard | |
| 4,842,289 A * | 6/1989 | Samuels ............. | 280/8 |
| 4,923,202 A | 5/1990 | Breveglieri et al. | |
| 5,000,467 A | 3/1991 | Becca | |
| 5,092,463 A | 3/1992 | Dees | |
| 5,333,885 A | 8/1994 | Pullman | |

(Continued)

FOREIGN PATENT DOCUMENTS

GB      2133977 A  *  8/1984

OTHER PUBLICATIONS

Smart Innovations/The Newsletter of CleverGear.com, vol. 2, Issue 2, CleverGear.com, Internet, US.

(Continued)

*Primary Examiner*—Christopher Bottorff
(74) *Attorney, Agent, or Firm*—Richard A. Ryan

(57) ABSTRACT

The lawn and garden implement caddy is useful for storing and transporting various implements, including long handled tools, hand tools and containers, useful in lawn and garden care. The caddy has a wheeled base with a front area having a container platform and a rear area that supports the head portion of the long handled tools. A center support interconnects the base with the top support and provides a plurality of shaped members that form a lower container enclosure and support the top support frame. The center support also includes a mechanism for supporting a lower container on or above the container platform. The top support frame forms a container enclosure in the front and a series of openings in the back configured to receive the handle end of the long handled tools. With the caddy, a lawn care worker can efficiently and effectively care for a lawn or garden.

24 Claims, 6 Drawing Sheets

U.S. PATENT DOCUMENTS

| | | |
|---|---|---|
| 5,354,023 A | 10/1994 | Meeks |
| 5,390,944 A | 2/1995 | Sherwin |
| 5,704,496 A | 1/1998 | Latta |
| 5,833,250 A * | 11/1998 | Schier et al. ............. 280/47.19 |
| 6,179,306 B1 * | 1/2001 | Maxwell ................... 280/47.26 |
| 6,220,610 B1 * | 4/2001 | Cox ......................... 280/47.19 |
| 6,260,865 B1 | 7/2001 | Yacobi et al. |
| 6,666,465 B2 * | 12/2003 | Chan ........................ 280/47.26 |
| 6,827,357 B2 * | 12/2004 | Calmeise et al. ........ 280/47.34 |
| 6,851,686 B2 * | 2/2005 | Figueroa .................... 280/79.5 |

OTHER PUBLICATIONS

The Garden Rover, CleverGear and Other Smart Innovations, CleverGear.com, Internet, US.

* cited by examiner

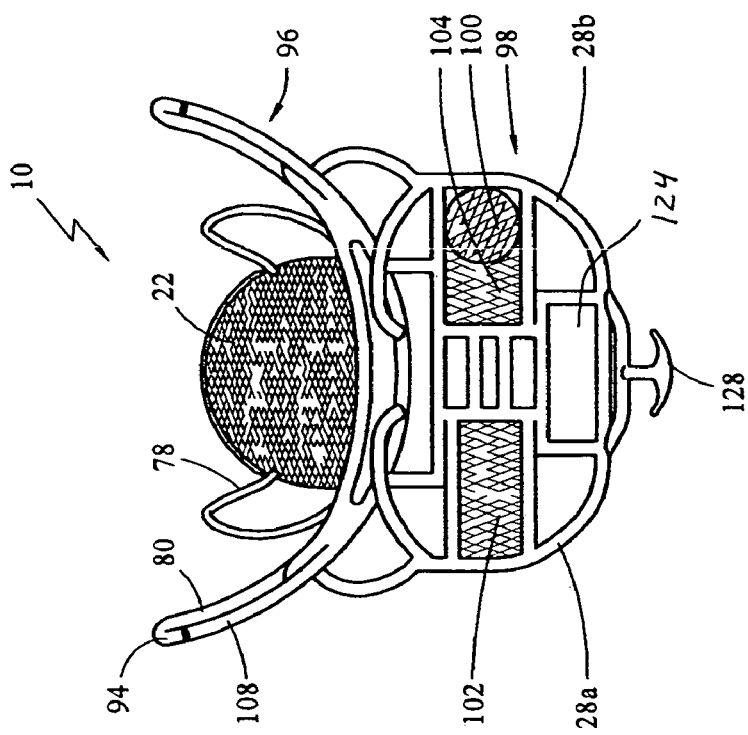
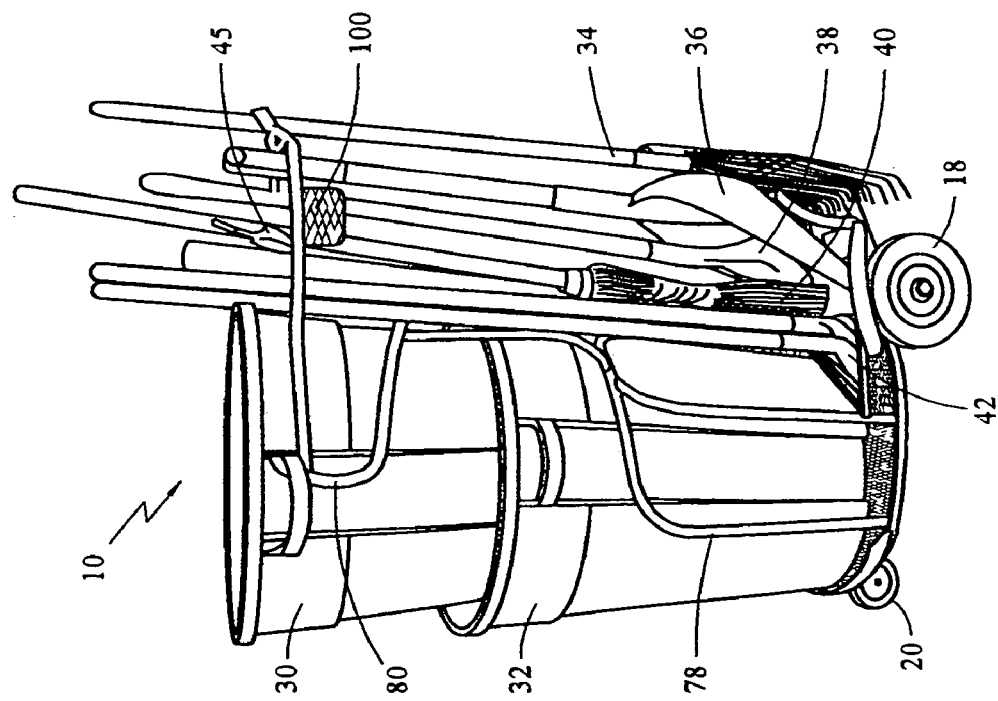

LAWN AND GARDEN IMPLEMENT CADDY

CROSS-REFERENCE TO RELATED APPLICATIONS

This application claims the benefit of U.S. Provisional Application No. 60/461,377 filed Apr. 10, 2003.

BACKGROUND OF THE INVENTION

A. Field of the Invention

The field of the present invention relates generally to manually propelled lawn and garden caddies that are configured for hauling and storing implements useful for lawn and garden care, including long and short handled tools, refuse containers and other equipment and materials useful for working on lawns and gardens. More particularly, the present invention relates to an improved lawn and garden caddy that is easy to move, able to carry multiple refuse containers and which carry the tools in an efficient and easy to use manner. Even more particularly, the present invention relates to such a lawn and garden tool caddy that can safely and effectively carry an assortment of tools for working on lawns and gardens.

B. Background

Many people desire to have attractive and healthy lawns and gardens and, as a result, much time, effort and money is spent to obtain the desired lawn and/or garden. Although many home or business owners take care of their own lawns and gardens, a significant number of people hire lawn maintenance workers to take care of all or at least a portion of their lawns and/or gardens (hereinafter, collectively professional and non-professional persons who work on lawns and gardens are referred to as "lawn care workers"). It is well known that many different types of tools and other implements are available and necessary to allow the lawn care worker to properly and efficiently take care of the lawn or garden. For purposes of this disclosure, the term "implements" includes various long and short handled tools, various containers, gloves, water jugs and other equipment and materials used in lawn and garden care. More specifically, the term "implements" includes, but is not limited to, long handled tools such as rakes, shovels, hoes, edgers, picks and the like, short handled tools such as pruning shears, hand trowels, hand cultivators, small shovels and the like, and containers such as trash cans and the like which are used for hauling soil, plants and other materials to the work site and refuse and trash away from the work site. In addition to implements, the typical lawn care worker will often utilize seeds, fertilizers, various chemicals and other materials to assist him or her with taking care of the lawn or garden (collectively, these and other such materials are referred to generally as "lawn care materials").

Although most people obtain significant enjoyment from working on lawns and gardens, a well known problem with such work is the need to store and transport the implements and materials needed to properly and efficiently work on the lawn or garden. The variety of shapes and sizes of the implements needed or useful for working on lawns and gardens makes them difficult to store and carry. Although many people have areas of the garage or a storage shed set aside or adapted for storing their lawn and garden implements, these implements still tend to be haphazardly stored. For instance, it is common to merely store the long and short handled tools in one of the open containers and/or a wheel barrow or to hang them on various hooks placed on walls in the storage area. These storage "solutions" for lawn and garden care implements have problems with being able to safely and effectively (meaning keeping them relatively accessible) store without damaging the implements and/or other items in the storage area. In addition, once they are carried to the work site the long and short handled tools must be emptied onto the ground so that the container can be used, which then makes the container unuseable for moving the implements to a new location. On the other hand, loosely carrying a number of different sized and shaped lawn and garden care implements to the work site where they are needed or may be needed presents significant difficulty for most people. As a result, the typical lawn care worker will only carry a few selected implements at one time and either make an educated guess which implements will be needed or make several trips to carry all those that may be needed. Needless to say, lawn and garden work is generally not done in a single, fixed location. For instance, the typical lawn care worker will at least need to move around the lawn or garden of a single home, business or other location and, in the case of professional lawn care workers, will need to move from one lawn to another.

A number of yard carts and caddies exist for assisting the lawn care worker with the storage and transport of the implements necessary to properly take care of a lawn or garden. One such lawn cart is known as the Garden Rover. The Garden Rover has an upstanding portion with multiple slots for inserting the handle end of long handled tools, two rear-mounted wheels for mobility, a forward rack portion having a vinyl/fabric pouch for holding short handled tools and loose materials and a platform for carrying a container. A handle portion allows the user to tilt the Garden Rover on its wheels, like a hand truck, so that it may be rolled from one place to another. One particular problem with the Garden Rover, and like apparatuses, is that the ends of the long handled tools that are the most dangerous (i.e., the ends having the rake tines, hoe blade, shovel blade and etc.) are facing upwards and, as a result, are tilted toward the user when moving the Garden Rover. In addition, the tools in the slots tend to move around relatively freely and the platform is suited for carrying only one container, which for many lawn care workers is insufficient to meet their needs.

Various lawn and garden tool carts and caddies are also described in several United States patents. For instance, U.S. Pat. No. 6,260,865 to Yacobi describes a tool holder that is also configured like a hand truck but has a tool holder compartment with multiple gripping devices suitable for gripping the handle of long handled tools so that the working end is down on the cart base. This tool holder does not have room for refuse containers or a mechanism to conveniently store small hand tools. U.S. Pat. No. 5,000,467 to Becca describes a hand truck type of trash can caddy for carrying a trash can. This caddy has a relatively complicated spring-loaded hook assembly for grasping the peripheral rim of a trash can container and trash can lid. U.S. Pat. No. 4,350,366 to Helms describes a lawn and garden cart having a bottom storage box, a tool holder mechanism comprised of multiple holes for inserting the handle end of long handled tools and a trash bag bracket for removably holding a trash bag. U.S. Pat. No. 3,894,748 to Ratcliff describes a lawn and garden cart that has a platform mounted on four wheels, an upstanding portion having multiple holes for holding the handle ends of long handled tools and a circular bracket for holding trash bags. Like the Garden Rover, the Helms and Ratcliff patents carry the long handled tools in a manner that could cause the sharp and relatively dangerous ends of the tools to hit the lawn care worker in the upper body and/or face.

Although the above-mentioned carts and caddies do provide apparatuses for storing and carrying lawn and garden implements, at least to some degree, the limitations and drawbacks associated with these carts/caddies have somewhat limited their full acceptance and use. What is needed, therefore, is an improved lawn and garden implement caddy that is configured to store and carry a variety of different sized and shaped lawn implements, including long and short handled tools, refuse containers and other equipment and materials needed or useful for lawn and garden care. The preferred lawn and garden implement caddy should be relatively inexpensive to make, easy to use, adaptable for many different types of implements and able to store and transport the implements in a manner that does not endanger the lawn care worker. Ideally, the components for the lawn and garden caddy should facilitate easy movement of the implements and not be easily damaged by regular use or susceptible to corrosion and other problems associated with lawn and garden care.

SUMMARY OF THE INVENTION

The lawn and garden implement caddy of the present invention solves the problems and provides the benefits identified above. That is to say, the present invention discloses a new and improved lawn and garden implement caddy that makes it relatively easy to safely store and transport a variety of different shaped and sized lawn implements, including long and short handled tools and refuse containers. The lawn and garden implement caddy of the present invention is made out of materials that resist damage and corrosion during normal usage and is configured to be relatively easy to move over different types of surfaces, including concrete, asphalt, grass and earth. The lawn and garden implement caddy of the present invention allows the lawn care worker to carry two refuse containers and most tools useful or necessary for proper lawn and garden care.

In one aspect of the lawn and garden implement caddy of the present invention, the caddy primarily comprises a base, a center support and a top support. In the preferred embodiment, the base has a wheel section with three wheels, the front one of which is a pivoting castor-type wheel, that are mounted to a base frame to allow easy and stable movement of the caddy, a front section with a baseplate on the base frame forming a container platform, and a back section configured to receive the head portions of the long handled tools. The center support has a lower end connected to the base and an upper end that connects to the top support. The center support comprises a support post which provides the structural support for the caddy and supports an articulating container holding mechanism for holding a container. A plurality of shaped support members attached to the support post forms two container enclosures to at least partially enclose the containers stored/transported on the caddy. The top support has a top frame forming a top front section and a top rear section. The top front section is configured to support and at least partially enclose one of the containers. The top rear section has a plurality of support openings to receive the handle portions of the long handled tools and, if desired, one or more hand tools.

In the preferred embodiment, the back section of the base has a lower storage area with an opening allowing access to a support tray that is useful for storing/transporting a dustpan. Also in the preferred embodiment, the front section has a base storage compartment substantially disposed under the container platform that can be used for storing small hand tools and other equipment or materials. The base storage compartment can have a compartment door that closes flush with the container platform and opens to allow access to the base storage compartment through a compartment opening in the container platform. A pair of triangular storage trays in the base are configured to receive the head portion of a hoe, hooped hoe or similar long handled tools. The back section of the base has a spline support and a stabilizer bar for supporting two kinds of rakes on the caddy, in conjunction with rake handle supports attached to the top support. One of the containers is supported on a container support connected to the top front section of the caddy. Another container is supported on a bracket attached to the support post interconnecting the top support with the base or, preferably, on a generally H-shaped articulating securing mechanism. Several baskets are provided in the top support for holding a water bottle and various small items useful for lawn and garden care.

Accordingly, the primary objective of the present invention is to provide a lawn and garden implement caddy that provides the advantages described herein and which overcomes the disadvantages and/or limitations associated with presently available lawn and garden implement caddies.

It is also an important objective of the present invention to provide a lawn and garden caddy that allows implements to be stored and transported in a manner that is safe for the lawn care worker using the lawn and garden caddy.

It is also an object of the present invention to provide a lawn and garden caddy that is configured to store and transport long handled tools, short handled tools, containers and other materials or equipment.

It is also an object of the present invention to provide a lawn and garden caddy that is configured to hold lawn and garden care implements in an efficient and organized manner, to be easily moved without risk of harm to the lawn care worker and adaptable for carrying multiple containers and/or various lawn care materials.

The above and other objectives of the present invention are explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention:

FIG. 7 is a left side view of the lawn and garden implement caddy of the present invention showing various implements being stored or carried thereon;

FIG. 8 is a top view of an alternative embodiment of the lawn and garden implement caddy of the present invention;

DETAILED DESCRIPTION OF THE PREFERRED EMBODIMENTS

With reference to the figures where like elements have been given like numerical designations to facilitate the reader's understanding of the present invention, and particularly with reference to the embodiments of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 2:
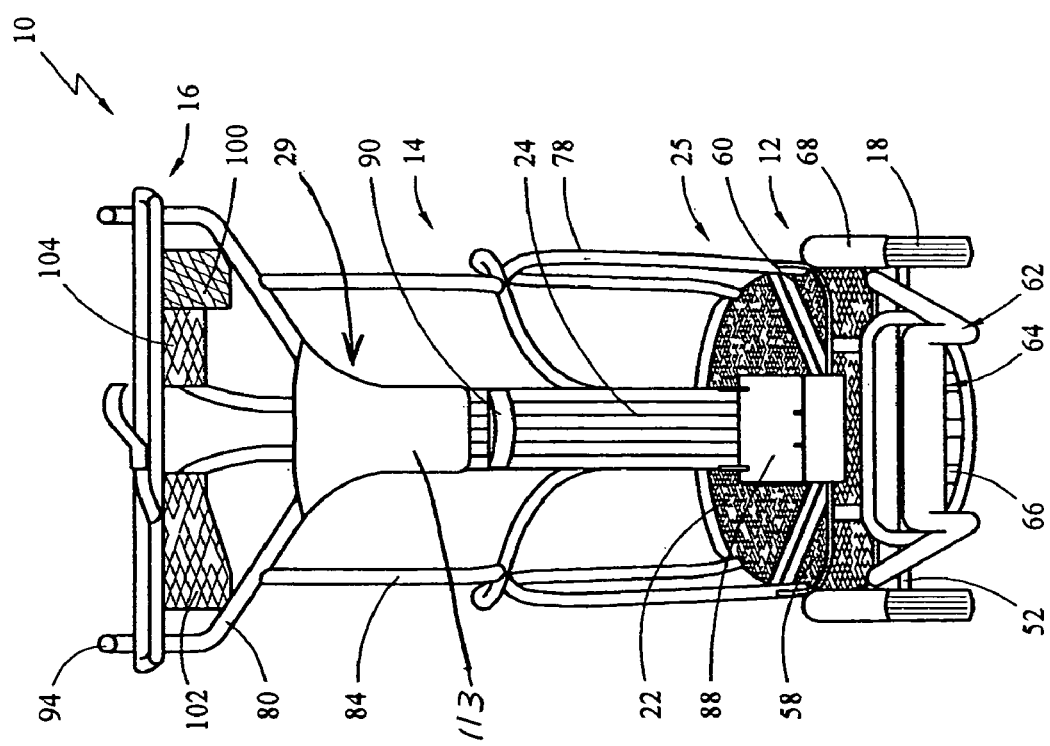
FIG. 2 is a left side view of a preferred embodiment of the lawn and garden implement caddy of FIG. 1.

A preferred embodiment of the lawn and garden implement caddy of the present invention, identified generally as 10 in the figures, is configured to assist the lawn care person, whether professional lawn care worker or not, who utilizes various lawn implements to care for the lawn. As best shown in FIG. 2, the lawn and garden implement caddy 10 primarily comprises three functionally separate, but interrelated, areas, the base 12, a main center support 14 and top support 16. In a preferred embodiment, the lawn and garden caddy 10 is generally made of ½" and ¾" galvanized metal and channel iron that is shaped and welded as shown in the figures to accommodate the implements to be carried. Alternatively, caddy 10 can be made out of various other metals, plastics, composites or other materials that are suitably strong to carry the various implements, durable for the intended use (i.e., which may be different for the professional or homeowner) and sufficiently corrosion resistant for use in outdoor locations. As known to those skilled in the art, caddy 10 of the present invention can also be manufactured out of a combination of materials, with those components of the caddy 10 requiring higher strength or durability being made out of lightweight but strong metals, such as aluminum and the like, and the components that are not subjected to high loading demands being made out less expensive and lighter materials, such as plastic and the like.

Figure 4:
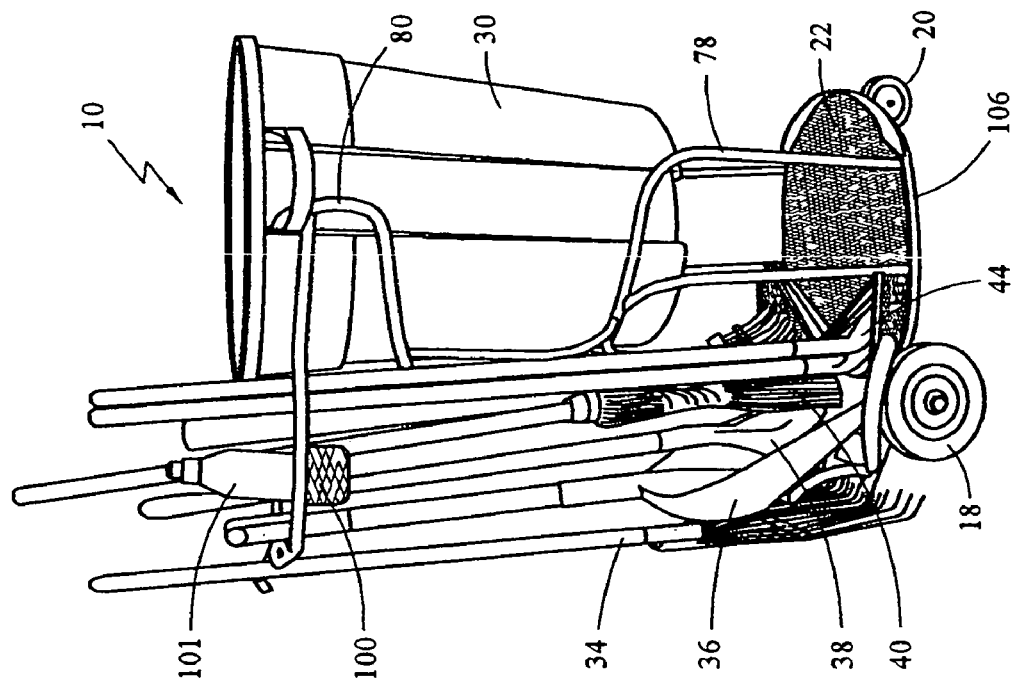
FIG. 4 is a right side view of the lawn and garden implement caddy of the present invention illustrating various implements being stored and/or carried thereon.

Each of the three main areas, base 12, center support 14 and top support 16 each have their own function. Base 12 carries and supports all other necessary components of caddy 10 and, in the preferred embodiment, connects to a pair of rear wheels 18, a single front wheel 20 and container/carrier platform 22 and, as shown in FIGS. 4 and 7, supports the head portions of the long handled tools. The center support 14 primarily comprises a substantially vertical support post 24, which interconnects base 12 and top support 16. The lower end 25 of center support 14 is connected to base 12. Top support 16, made up of top frame 26, compartmentalizes and supports the upper portion of the long tool handles, supports a trash or refuse-type container (described in more detail below) and provides support for handles 28, shown as right handle 28a and left handle 28b, best shown in FIG. 5. The upper end 29 of center support 14 connects to top support 16 to form an integral unit comprised of base 12, center support 14 and top support 16. As best shown in FIGS. 4 and 7, these main areas 12, 14 and 16 function together to hold a variety of implements on caddy 10 to allow the lawn care worker to efficiently and safely store and transport the implements to and from the lawn and/or garden where needed. For purposes of discussion herein, caddy 10 is shown in use with a first container 30, a second container 32, certain long handled implements, shown in FIGS. 4 and 7, namely a rake 34, a 'D' handle shovel or scoop 36, a flat or pointed shovel 38, a straight-type or push-type broom 40, hoe 42 and hooped hoe 44. As known to those skilled in the art, various other long and short handled implements can be utilized with caddy 10, in addition and/or alternatively to those shown in the enclosed figures. For instance, caddy 10 is also configured to carry a long-handled cultivator and shrub rake.

Figure 1:
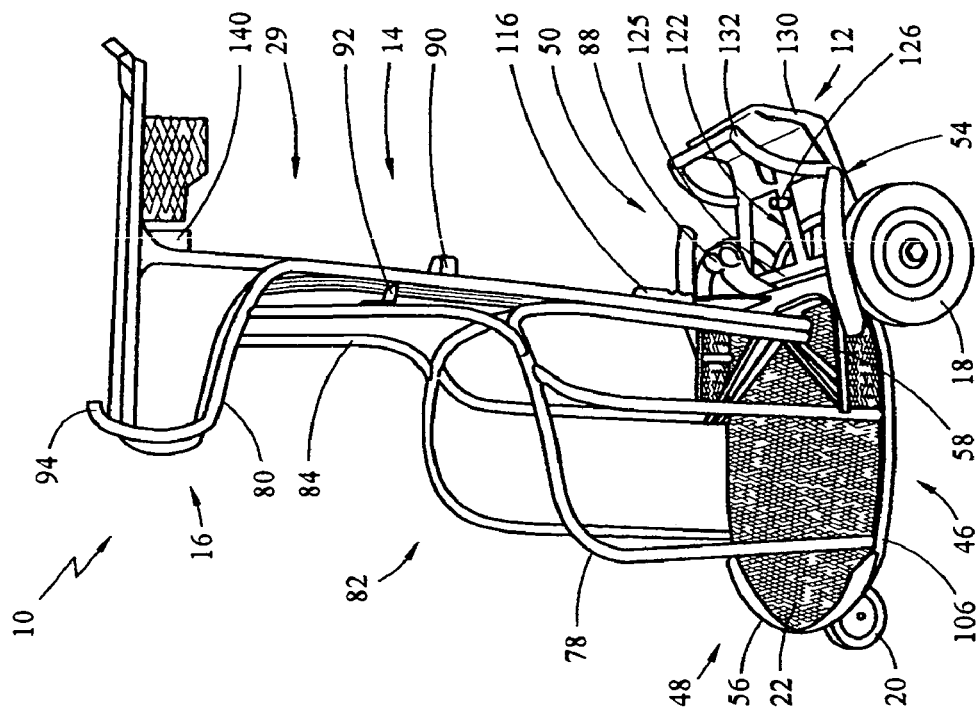
FIG. 1 is a rear view of a preferred embodiment of the lawn and garden implement caddy of the present invention.

Base 12 is divided into three general areas, wheel section 46, front section 48 and rear section 50, separated from front section 48 by support post 24. As stated above, in the preferred embodiment wheel section 46 comprises a three-wheeled system having a pair of rear wheels 18 and a front wheel 20. In this embodiment, rear wheels 18 are standard wheels (i.e., eight inch rubber wheels) rotatably attached to an axle member 52 attached to base frame 54 and front wheel 20 is a castor-type wheel that is pivotally disposed below base frame 54. The three-wheeled system provides improved support for caddy 10, particularly needed when loaded with implements and when first 30 and second 32 containers are full of refuse, such as grass, leaves, weeds, trash and other materials. Front section 48 comprises container platform 22 on which second container 32 is supported or, when second container 32 is not used, on which miscellaneous lawn and garden materials can be carried, such as soil, fertilizer and other bulky and/or heavy materials. An upwardly extending lip 56 is utilized on the forward edge of container platform 22 to prevent second container 32 or the miscellaneous materials from easily sliding off container platform 22. In one embodiment, lip 56 is approximately one inch high. The rear side of container platform 22 comprises a pair of storage trays 58 and 60 that are used, in one configuration, to support the head of hoe 42 and hooped hoe 44 together in one tray and a shrub rake and long-handled cultivator in the other tray. As shown in the figures, such as FIGS. 1 and 2, storage trays 58 and 60 are formed by shaped frames above container platform 22 so that the heads of the implements placed therein will be generally prevented from falling out of storage trays 58 and 60 while caddy 10 is being moved. Rear section 50 is shaped and configured to support the heads of various implements. The preferred configuration of rear section 50 is set forth below in the discussion regarding the placement of the various rake 34, shovels 36 and 38, and broom 40 implements, as well as a second rake, long-handled cultivator or other long-handled lawn implements, in caddy 10. As shown in FIG. 1, on the underside of rear section 50 is located a lower storage area 62 that has a rearward facing opening 64 that opens into a support tray 66 for supporting a dustpan (not shown) or like implement. The dustpan can be easily slid into and out of lower storage area 62 as needed. If desired, rear section 50 can also comprise a pair of splash guards 68 positioned above rear wheels 18 to prevent water, mud and other materials from splashing upward onto the user of caddy 10 while it is being moved from one location to another.

Figure 3:
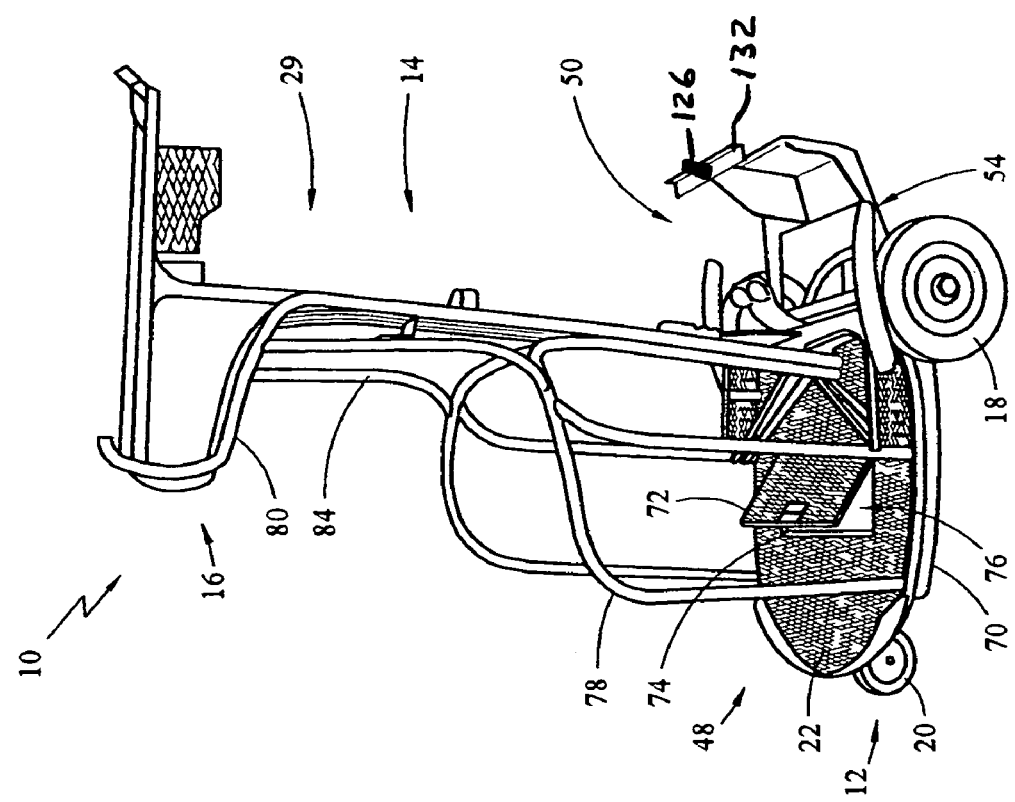
FIG. 3 is a left side view of an alternative embodiment of the lawn and garden implement caddy of FIGS. 1 and 2 showing the use of a storage compartment in the base.

In an alternative embodiment, shown in FIG. 3, base 12 also comprises a base storage compartment 70 located under container platform 22 for storing small hand tools, such as the three-prong fork, hand trowel/shovel (shown as 45 in FIG. 7) and the like. Base storage compartment 70 can also be utilized to store other lawn materials, such as sprinkler heads and other equipment. In this embodiment, access to base storage compartment 70 is gained through a compartment door 72 that, when closed, is supported in a generally flush position with container platform 22 by door frame 74 forming the compartment opening 76 through which the tools and other materials are placed into base storage compartment 70. In the embodiment shown in the figures, base storage compartment 70 substantially extends from near the front side of rear wheels 18 to front wheel 20 and the width of container platform 22. Opening 76 is configured to be within container platform 22 in front of storage trays 58 and 60. As known to those skilled in the art, various other configurations are possible for base storage compartment 70. Due to its location under container platform 22, base storage compartment 70 should be configured to be durable (i.e., not easily damaged by contact with the ground, curbs or other objects).

Figure 5:
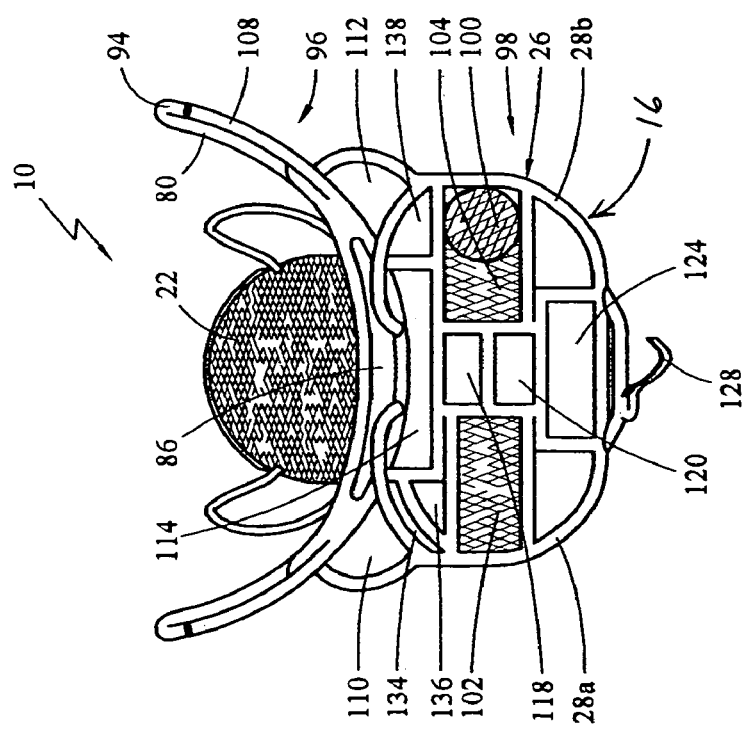
FIG. 5 is a top view of the lawn and garden implement caddy of the present invention shown in FIGS. 1 and 2.

In the preferred embodiment, center support 14 primarily comprises a support post 24, which is shown in the figures as being formed from eight ½" pipes welded together in a row, and a plurality of shaped support members, such as arch supports 78 and congruent arms 80, used to provide support to support post 24 and top support 16. Support post 24 gives caddy 10 its holding ability and symmetry. The lower end 25 of support post 24 is welded to base 12 and the bifurcating arch supports 78. As shown in FIGS. 1 and 2, both bifurcating arch supports 78 and congruent arms 80 extend out towards the front of caddy 10 to form a container enclosure 82 for first 30 and second 32 container when placed on container platform 22. Bifurcating arch supports 78 extend down to the container platform 22 and congruent arms 80 extend up to top frame 26. In addition to enclosing containers 30 and 32, arch supports 78 and congruent arms 80 adds stability and strength to the vertical post 24. Two of the inner pipes in center support 14 arch upward and outward to form top support congruent arms 80, which support first container 30 and support and connect to the top support 16. Two bifurcating pipe spars 84 are used to provide additional support for top support 16. The next two inner pipes, which arch up and away from each other, also carry the top support 16 and form the hedge trimmer opening 86, as shown in FIG. 5. Mounted onto support post 24, as shown in FIG. 1, are broom support member 88, loper blade support 90 and a bracket 92, such as an L-shaped bracket, to help hold second container 32, which can be a 32 gallon container, in container platform 22. As set forth below, support post 24 can include an adjustable securing mechanism having a holding tongue to secure second container 30. Container supports 94 at the ends of congruent arms 80 support first container 30 above container platform 22, as best shown in FIG. 4, so that second container 32 or various lawn and garden supplies can be placed on container platform 22 underneath first container 30. As shown in FIG. 7, lawn and garden caddy 10 can carry two thirty-two gallon trash containers 30 and 32, which is the most commonly used size, one above the other. Containers 30 and 32 can be easily lifted off of caddy 10 and replaced at any time. As stated above, when container 32 is removed, container platform 22 becomes an area for carrying lawn care materials.

Figure 6:
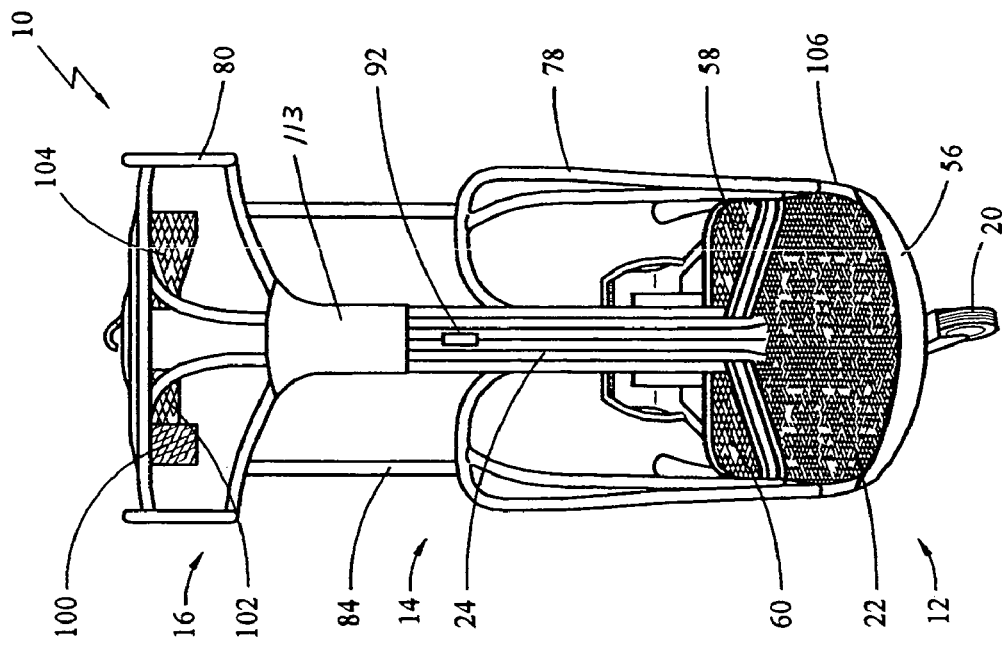
FIG. 6 is a front view of the lawn and garden implement caddy of the present invention shown in FIGS. 1 and 2.

In the preferred embodiment shown in the figures, particularly FIG. 5, top support 16 is a generally open U-shaped area that is divided into two sections, a top front section 96 that has a large opening which forms the support area for first container 30 and a top rear section 98 that is compartmentalized to hold small hand tools, baskets and the handles for the long handled tools. As best shown in FIG. 5, caddy handles 28, shown as 28*a* and 28*b*, are built into the corners of top support 16 and are used to move caddy 10 around on wheels 18 and 20. A water bottle holder support 100, best shown in FIGS. 1 and 6, formed from a basket-type of configuration that is welded to top frame 26 of top support 16, is sized and shaped to hold a standard water bottle, shown as 101 in FIG. 4. Additional baskets 102 and 104, formed from expanded metal to have openings accessible from above top support 16 (as shown in FIG. 5), are located on the top support 16 and are useful for storing various small items to be utilized in lawn and garden care. The other compartment areas in top support 16, useful for receiving the handle ends of various implements, are explained below in relation to those implements.

First 30 and second 32 containers are loaded onto caddy 10 from the front thereof. Second container 32 is place above the baseplate 106 forming container platform 22 by making sure top peripheral lip of second container 32 slides over the L-shaped bracket 92 on main support post 24 so as to prevent second container 32 from falling forward off of caddy 10. The front lip 56 on baseplate 106, which can be 1" high, prevents the bottom of second container 32 from sliding out of the front of caddy 10. First container 30 is set on caddy 10 by placing the handles of first container 30 over container supports 94 at the ends of top support congruent arms 80 mounted on support post 24. Container supports 94 and top section frame 108 of top front section 96 prevents shuttling of first container 30.

Hoe 42 and hooped or hula-hoe cultivator 44 can be grouped together and a shrub rake and long-handled cultivator, or other like tools, can be grouped together to stand with their head portions in triangular storage trays 58 and 60 of container/carrier platform 22, with the handles directed generally upward. These tools can be placed on storage trays 58 and 60 by lifting the handle portions of the tools into upper tray openings 110 and 112 (best shown in FIG. 5), and then dropping the head portions of the tools into the storage trays 58 and 60, respectively. The use of small (i.e., ½") flat generally perpendicular metal posts positioned approximately ¾" apart in storage trays 58 and 60 can prevent shuttling of the tools in storage trays 58 and 60. In the preferred embodiment, as shown in the figures, storage trays 58 and 60 are approximately the same size. Storage trays 58 and 60 exploit the syncline shape of the standard 32 gallon containers (i.e., containers 30 and 32) to productively utilize the void spaces along the sides to hold the heads of smaller headed, long handled yard and garden tools, such as hoe 42 and hooped hoe 44.

As stated above, lawn and garden caddy 10 also has separate areas configured to accept a hedge trimmer and a loper. In the preferred embodiment, hedge trimmer opening 86 is located between the bifurcating pipes forming arch supports 78 and congruent arms 80 and the center of support post 24. The blade of the hedge trimmer is dropped into hedge trimmer opening 86 (best shown in FIG. 5) into the center of support post 24. Trimmer opening 86 is created by eliminating the two center most support posts at the proper depth to securely accommodate the hedge trimmer blade. Rectilinear cover plates 113, shown in FIGS. 1 and 6, on either side of support post 24 to secure hedge trimmer blade and for improved aesthetics. The loper storage area, formed by loper support 90, is located behind the support post 24 and is, in a preferred embodiment, formed by a 1" wide metal band bisecting support post 24 (as best shown in FIG.

1). The loper is let down blade first through the loper handle support opening 114 (shown in FIG. 5) into loper support 90 on the rearward facing side of support post 25. With the handle of the loper directed upward, the user is protected from harm.

Lawn and garden caddy 10 also has areas configured to store broom 40, such as the straight or push broom type. As best shown in FIG. 1, broom support member 88 is located behind and near the bottom of main support post 24. In one configuration, broom support member 88 is a folded piece of sheet metal (i.e., 6½" by 11½") with a bent out flat area, as best shown in FIG. 2. A straight broom is slid or pushed into the fold area partially formed by broom support member 88. Push brooms are placed onto the extended flat area of broom support member 88. A push broom notched head support 116 is used to support the head of a push broom. For either type of broom, the broom handle is lifted through the broom handle top support opening 118 in top support 16, best shown in FIG. 5, and the head portion of the broom is placed in broom support member 88 or push broom notched head support 116. The lawn and garden implement caddy 10 of the present invention is shown with a straight broom in FIGS. 4 and 7.

The lawn and garden caddy 10 also has areas configured to store one or more rakes 34, such as a steel rake and spring rake, "D" handled scoops (or spades) 36 and a straight or pointed shovel 38. The shovel storage area is located directly under broom support member 88 behind support post 24. The shovel handle of shovel 38 is lifted up through the shovel handle top support opening 120 in top support 16 (shown in FIG. 5) and the shovel head is set into either of the shovel head supports 122, configured to accept the shovel head, in the shovel area of rear section 50. The head of the "D" handled scoop 36 is placed directly behind the shovel head of shovel 38 in the shovel area and its handle is lifted through the "D" handle support opening 124 in top support 16. A holding trough 125 can be welded into the rear section 50 of base 12, as shown in FIG. 2, to hold the head of "D" handled shovel 36. The steel rake area for a steel rake (not shown) is located behind the "D" handled scoop head in rear section 50 of base 12. A steel rake support post 126, such as a ½" by 1" post shown in FIGS. 2 and 3, in the center of stabilizer bar 132 prevents shuttling of the head of steel rake. The head of the steel rake is set onto stabilizer bar 132 using the stabilizer bar 132 as a steel rake head holding platform. The spring rake handle support 128, which can be the single clip shown in FIG. 5 or the dual clip assembly shown in FIG. 8, for spring rake 34 is located on top support 16 behind the "D" handle scoop support opening 124. The dual clip assembly shown in FIG. 8 allows use of both a steel rake and spring rake 34. In use, spring rake 34 is tilted forward to enter the opening in the "C" shaped gib forming spring rake handle support 128 and then the rake is aligned vertically and dropped into rake spline support 130, which is located substantially vertically below rake handle support 128, on baseplate 106. Steel rake can be placed in first, in front of spring rake 34. Use of a spring rake spline stabilizer bar 132, also substantially vertically displaced from rake handle support 128, prevents shuttling of the rake head of spring rake 34.

As set forth above, lawn and garden caddy 10 of the present invention also has areas configured to accept a number of small implements, such as dust pans, trowels, hand cultivators and hand pruners. Caddy 10 also has areas to accept water bottle 101 and a basket. Lower storage area 62 for the dustpan is under baseplate 106 of container platform 22 and is configured for the dustpan to slide under baseplate 106 from the rear of caddy 10. A hand trowel slot 134 in top support 16, as shown in FIG. 5, is configured to receive the head of hand trowel 45, which is placed downwardly into slot 134. A hand cultivator opening 136 is provided in top support 16 for the handle of a typical hand cultivator. The handle of the hand cultivator is dropped into opening 136 and it is held in place by the diagonal shaped head of the hand cultivator. Top support 16 also has a hand pruner opening 138 for receiving the blade end of a hand pruner. A "U" shaped metal band 140, shown in FIG. 2, with a slot cut at the bottom is welded to the top support frame 26 under top support 16. The hand pruner blade is placed downward through the hand pruner opening 138 and into the slot in metal band 140, where it is held in place by the blade and support post 24. Alternatively, or in addition to, the various small implements, including hand tools, can be stored in base storage compartment 70 and covered by compartment door 72. A water bottle holder 100, best shown in FIG. 5, is formed from a basket-type of configuration that is welded to the frame of top support 16 along with baskets 102 and 104. Water bottle holder 100 is sized and shaped to securely hold standard water bottle 101. Baskets 102 and 104 are useful for storing various small tools or other items useful for lawn and garden care.

Figure 9:
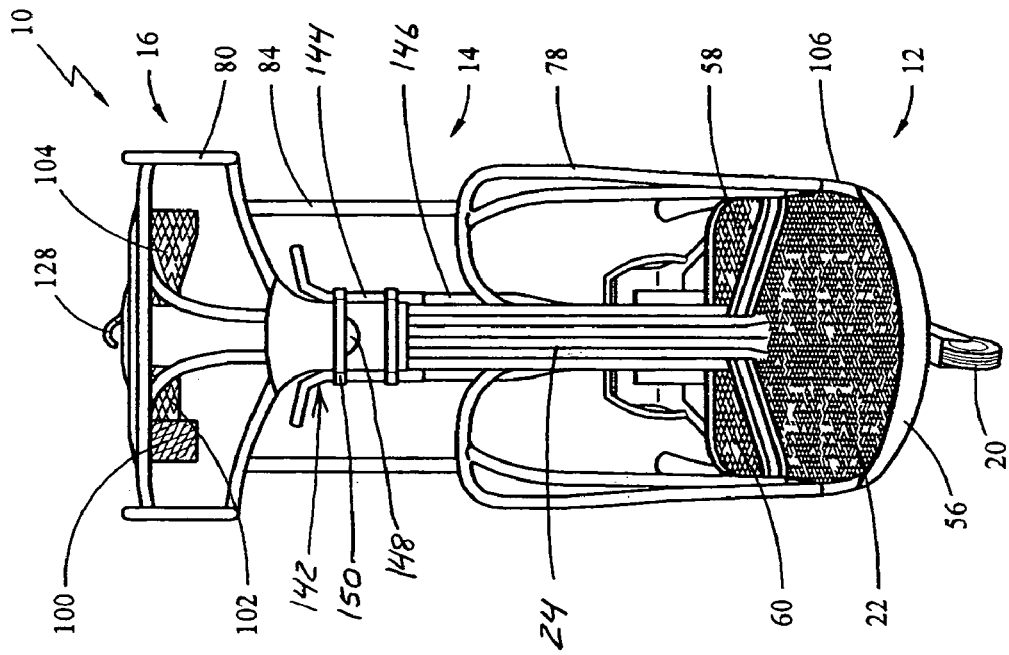
FIG. 9 is a front view of the lawn and garden implement caddy of the present invention showing an alternative mechanism to support the second container on the center support.

If desired, caddy 10 can be configured with an adjustable container securing mechanism 142 that adjusts for the height of second container 32 and supports second container 32 on caddy 10. As shown in FIG. 9, one such configuration for securing mechanism 142 is to utilize the generally H-shaped container support handles 144 supported by two opposing outer tubes 146 vertically disposed above base 12 on center post 24. A smaller diameter inner support tube (not shown) interconnects the lower open ends of each of the support handles 144 to the open upper end of an outer tube 146. A pin connects the inner support tube to the outer tube 146 in a manner that allows the inner support tube to pivot forward and rearward relative to outer tube 146 to allow for the forward and rearward movement of support handles 144, which freely rest on the hinged inner support tubes. The downward facing tubes of support handles 144 fit over the small hinged inner support tubes to allow the H-shaped container support handles to move back and forth and up and down. A forward stop is built into the center post 24 to prevent excessive forward movement of securing mechanism 142. A tongue member 148 on adjustable securing mechanism 142 protrudes generally downward to engage the upper peripheral lip of second container 32 to help secure it on caddy 10. In the embodiment shown in FIG. 10, tongue member 148 is attached to or integral with cross-member 150 that forms part of the H-shaped container support handles 144. In use, container support handles 144 are raised when second container 32 is placed on caddy 10, pivoted forward and then lowered such that tongue member 148 engages the upper peripheral lip of second container 32 to effectively secure second container 32 on caddy 10. A small notched metal protrusion can be utilized to keep support handles 144 in place when not being used to hold second container 32.

Figure 10:
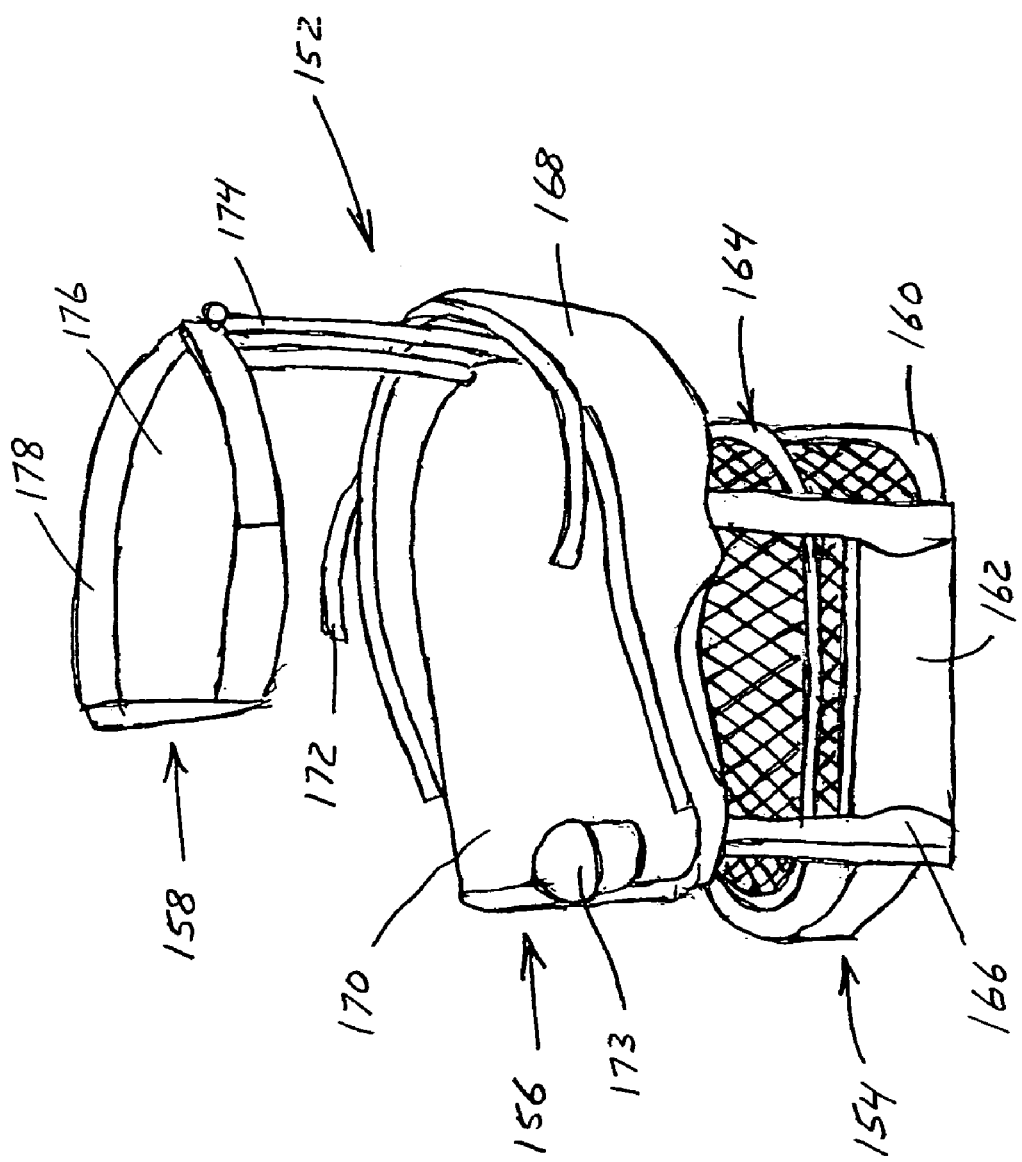
FIG. 10 is a perspective view of a removable tray apparatus configured for use with the lawn and garden implement caddy of the present invention.

In an alternative embodiment, caddy 10 also includes tray apparatus 152, shown in FIG. 10, that is configured to be utilized with caddy 10. In a preferred embodiment, tray apparatus 152 comprises three tray sections, first tray section 154, second tray section 156 and third tray section 158 that are interconnected and configured to cooperate with top support 16 to provide additional storage, carrying and display for implements and other lawn and garden materials. In this embodiment, first tray section 154 has a generally flat first bottom surface 160 and upstanding side walls 162 along three side so of the periphery thereof, leaving one side open for access to bottom surface 160. The user can place various lawn and garden materials directly on bottom surface 160 or, preferably, a removable tray 164 can be slid on and off of flat bottom surface 160 in the compartment formed by side walls 162. Removable tray 164 can be utilized to hold and carry a flat of plants, various loose plant materials (i.e., bulbs, etc.) or other lawn and garden materials. Preferably, removable tray 164 has a mesh configured bottom and sides to allow dirt, water and other materials to fall through removable tray 164. One or more first tray posts 166 are used to spatially dispose second tray section 156 above first tray section 154, as shown in FIG. 10. In the preferred embodiment, second tray section 156 has side walls 168 along at least part of the periphery of second tray bottom 170 to provide a partially enclosed surface on wish to place various lawn and garden materials, including lawn implements, plant materials and laws improvement materials (i.e., fertilizer, weed killer and etc.). Extending generally from side walls 168 of second tray section 156 are a pair of tray support arms 172 that are used to support tray apparatus 152 on top support 16. In one embodiment, tray support arms 172 cooperate with top section frame 108. Although tray apparatus 152 can be configured to be removably attached to caddy 10, in the preferred embodiment tray support arms 172 are fixedly connected, by welding or other means, to top section frame 108. Also in the preferred embodiment, second tray section 16 includes a small compartment 173 for storing small items, such as keys, glasses, and bolts/screws. In the embodiment shown in FIG. 10, small compartment 173 is a cup holder shaped compartment affixed to second tray bottom 170. If desired, a lid or other covering (i.e., a decorative flower or the like) can be used to cover small compartment 173 to reduce detection of items therein and help keep those items from falling out. One or more second tray posts 174 are used to spatially dispose third tray section 158 above second tray section 156, as shown in FIG. 10. In one embodiment, third tray section 158 comprises a third tray bottom 176 with upstanding side walls 178 along its entire periphery to form an enclosed tray for the user to place lawn and garden materials thereon when storing or using caddy 10 of the present invention. As with caddy 10, tray apparatus 152 can be made out of a variety of materials suitable for use with the lawn and garden materials likely to be stored or carried on caddy 10.

In use, the lawn and garden caddy 10 is loaded with various yard and garden implements, such as the tools and containers discussed above, making it a compact mobile storage area. The implements can be stored on caddy 10 until needed, at which time caddy 10 is either pushed or pulled on its three wheels 18 and 20 or pulled back on its rear wheels 18 like a hand truck to the work site. The three-wheeled configuration of caddy 10 provides a more stable and, therefore, safe apparatus relative to other available caddies. If desired, only first container 30 can be used, as shown in FIG. 4, so that a storage/carrier area is available for storing and carrying a variety of loose lawn care materials, such as hoses, seed, fertilizer and plants. One benefit of caddy 10 of the present invention is that this storage/carrier area is achieved while still being able to carry a standard 32 gallon refuse container. At the work site, caddy 10 is a mobile staging area for necessary yard and garden tools and containers. With the containers 30 and 32 off of caddy 10, caddy 10 can also be used as a carrier for moving materials and debris to and from the work site. After the yard work is completed, the various implements are placed on caddy 10 and it is put away, ready for use the next time lawn and/or garden work needs to be done. In one configuration, caddy 10 can be made to be approximately 48" tall, 30" long and 22 inches wide, weighing approximately 25 to 55 pounds empty and 50 to 85 pounds when loaded with the tools described above (depending on the materials used for caddy 10 and the weight of the various implements).

The improved safety of caddy 10 of the present invention, relative to presently available lawn and garden implement caddies, also results from the long handled tools being placed face down, as shown in FIGS. 4 and 7, so as not to hit the lawn worker's face or chest or to bang against each other. Lawn and garden caddy 10 is configured such that most tools have their own fitted sections making caddy 10 substantially balanced and very difficult for the implements to fall off. Caddy 10 is configured so that the tools can be removed with a simple lift up and pull down and out of top support 16 with one hand. Because lawn and garden caddy 10 holds all major lawn and garden hand tools and two 32 gallon trash containers 30 and 32, it acts as a mobile compact all-in-one place storage apparatus. For instance, if a broom 40 and dustpan are needed just lift them out, use them, replace on caddy 10 when done. Missing implements can be readily spotted because the majority of such implements have a specific area on caddy 10 that makes the missing implements conspicuous by their absence.

While there are shown and described herein certain specific alternative forms of the invention, it will be readily apparent to those skilled in the art that the invention is not so limited, but is susceptible to various modifications and rearrangements in design and materials without departing from the spirit and scope of the invention. For instance, it should be noted that the present invention is subject to modification with regard to the dimensional relationships set forth herein and modifications in assembly, materials, size, shape and use. For example, while certain lawn and garden care implements have been referenced herein with regard to the present caddy, other such implements and various lawn and garden materials could also be used. Therefore, it is contemplated that the appended claims will cover any modifications or embodiments as fall within the true scope of the invention.

What is claimed is:

1. An implement caddy for a plurality of implements, said plurality of implements including one or more long handled tools each having a head portion and a handle portion, one or more hand tools and one or more containers, said implement caddy comprising:

a base having a wheel section with one or more wheels mounted to a base frame, a front section with a baseplate on said base frame forming a container platform, and a back section configured to receive said head portions of said one or more long handled tools, said back section of said base having a rake spline support and a spline stabilizer bar, said rake spline support substantially vertically displaced from a rake handle support attached to said top frame;

a center support having a lower end and an upper end, said lower end of said center support connected to said base, said center support comprising a support post and a plurality of shaped support members, said plurality of shaped support members forming at least one container enclosure to at least partially enclose said one or more containers; and a top support connected to said upper end of said center support, said top support having a top frame forming a top front section and a top rear section, said top front section configured to at least partially enclose one of said one or more containers, said top rear section having a plurality of support openings to receive said handle portions of said long handled tools and/or to receive at least one of said one or more hand tools.

2. The implement caddy according to claim 1, wherein said back section of said base further comprises a lower storage area having an opening allowing access to a support tray.

3. The implement caddy according to claim 1, wherein said front section of said base further comprises a base storage compartment, said base storage compartment substantially disposed under said container platform.

4. The implement caddy according to claim 3, wherein said base storage compartment comprises a compartment door, said compartment door allowing access to said base storage compartment through a compartment opening in said container platform.

5. The implement caddy according to claim 1, wherein said base further comprises one or more storage trays connected to said container platform, said one or more storage trays configured to receive said head portion of at least one of said one or more long handled tools.

6. The implement caddy according to claim 1, wherein said wheel section comprises three wheels, at least one of said wheels pivotally disposed below said base frame.

7. The implement caddy according to claim 1, wherein said center support comprises a plurality of interconnected tubular members.

8. The implement caddy according to claim 1, wherein said top front section comprises at least one container support configured to releasably support one of said one or more containers in said container enclosure.

9. The implement caddy according to claim 1, wherein said top rear section comprises one or more baskets in said top frame.

10. The implement caddy according to claim 9, wherein at least one of said one or more baskets is shaped and configured to securely support a water bottle.

11. The implement caddy according to claim 1 further comprising a bracket attached to said support post, said bracket configured to releasably support one of said at least one container in said container enclosure.

12. The implement caddy according to claim 1 further comprising an adjustable container securing device configured to releasably support one of said at least one container in said container enclosure.

13. The implement caddy according to claim 12, wherein said adjustable container securing device comprises a generally H-shaped support handle.

14. The implement caddy according to claim 1 further comprising a tray apparatus mounted to said top support, said tray apparatus having one or more tray sections.

15. An implement caddy for a plurality of implements, said plurality of implements including one or more containers and one or more long handled tools, each having a head portion and a handle portion, and/or one or more hand tools, said implement caddy comprising:

a base having a wheel section with one or more wheels mounted to a base frame, a front section with a baseplate on said base frame forming a container platform, and a back section configured to receive said head portions of said one or more long handled tools, said back section of said base having a lower storage area with an opening allowing access to a support tray;

a center support having a lower end and an upper end, said lower end of said center support connected to said base, said center support comprising a support post and a plurality of shaped support members, said plurality of shaped support members forming at least one container enclosure to at least partially enclose said one or more containers, said support post having one or more brackets for releasably supporting one of said at least one container in said container enclosure; and a top support connected to said upper end of said center support, said top support having a top frame forming a top front section and a top rear section, said top front section configured to at least partially enclose one of said one or more containers, said top front section having at least one container support configured to releasably support one of said one or more containers in said container enclosure, said top rear section having a plurality of support openings to receive said handle portions of said long handled tools and/or to receive at least one of said one or more hand tools.

16. The implement caddy according to claim 15, wherein said front section of said base further comprises a base storage compartment, said base storage compartment substantially disposed under said container platform.

17. The implement caddy according to claim 16, wherein said base storage compartment comprises a compartment door, said compartment door allowing access to said base storage compartment through a compartment opening in said container platform.

18. The implement caddy according to claim 15, wherein said base further comprises one or more storage trays connected to said container platform, said one or more storage trays configured to receive said head portion of at least one of said one or more long handled tools.

19. The implement caddy according to claim 15, wherein said wheel section comprises three wheels, at least one of said wheels pivotally disposed below said base frame.

20. An implement caddy for a plurality of implements, said plurality of implements including one or more long handled tools each having a head portion and a handle portion, one or more hand tools and one or more containers, said implement caddy comprising:

a base having a wheel section with one or more wheels mounted to a base frame, a front section with a baseplate on said base frame forming a container platform, and a back section configured to receive said head portions of said one or more long handled tools;

a center support having a lower end and an upper end, said lower end of said center support connected to said base, said center support comprising a support post and a plurality of shaped support members, said plurality of shaped support members forming at least one container enclosure to at least partially enclose said one or more containers;

a bracket attached to said support post, said bracket configured to releasably support one of said at least one container in said container enclosure; and a top support connected to said upper end of said center support, said top support having a top frame forming a top front section and a top rear section, said top front section configured to at least partially enclose one of said one or more containers, said top rear section having a plurality of support openings to receive said handle portions of said long handled tools and/or to receive at least one of said one or more hand tools.

21. The implement caddy according to claim 20, wherein said back section of said base further comprises a lower storage area having an opening allowing access to a support tray.

22. The implement caddy according to claim 20, wherein said front section of said base further comprises a base storage compartment, said base storage compartment substantially disposed under said container platform.

23. The implement caddy according to claim 22, wherein said base storage compartment comprises a compartment door, said compartment door allowing access to said base storage compartment through a compartment opening in said container platform.

24. The implement caddy according to claim 20, wherein said base further comprises one or more storage trays connected to said container platform, said one or more storage trays configured to receive said head portion of at least one of said one or more long handled tools.

* * * * *